(12) United States Patent
Zhao et al.

(10) Patent No.: US 11,974,362 B2
(45) Date of Patent: Apr. 30, 2024

(54) V2X RESOURCE MAP FOR SEMI-PERSISTENT SCHEDULING WITH UNICAST/GROUPCAST SERVICES

(71) Applicant: Apple Inc., Cupertino, CA (US)

(72) Inventors: Pengkai Zhao, San Jose, CA (US); Dawei Zhang, Saratoga, CA (US); Fangli Xu, Beijing (CN); Haijing Hu, Beijing (CN); Haitong Sun, Irvine, CA (US); Sami M. Almalfouh, San Jose, CA (US); Wanping Zhang, San Jose, CA (US); Wei Zeng, San Diego, CA (US); Wei Zhang, Santa Clara, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 17/499,619

(22) Filed: Oct. 12, 2021

(65) Prior Publication Data

US 2022/0104311 A1 Mar. 31, 2022

Related U.S. Application Data

(63) Continuation of application No. 16/575,218, filed on Sep. 18, 2019, now Pat. No. 11,147,123.

(51) Int. Cl.
*H04W 76/14* (2018.01)
*H04W 4/40* (2018.01)
(Continued)

(52) U.S. Cl.
CPC ............ *H04W 88/04* (2013.01); *H04W 4/40* (2018.02); *H04W 24/10* (2013.01);
(Continued)

(58) Field of Classification Search
CPC ... H04W 24/10; H04W 72/044; H04W 72/20; H04W 72/542; H04W 76/14; H04W 76/19; H04W 88/04; H04W 92/18; H04W 72/12
(Continued)

(56) References Cited

U.S. PATENT DOCUMENTS 9,826,563 B2   11/2017 Sheng
10,225,858 B2   3/2019 Lee
(Continued)

FOREIGN PATENT DOCUMENTS

WO    2016181095 A1   11/2016
WO    2017078783 A1    5/2017

*Primary Examiner* — Harun Chowdhury
(74) *Attorney, Agent, or Firm* — Kowert, Hood, Munyon, Rankin & Goetzel, P.C.

(57) ABSTRACT

Apparatuses, systems, and methods for a wireless device to perform methods for determining resources for scheduling side-link communications. The resources may be semi-persistent and/or dynamic resources. A user equipment device (UE) may determine a resource map for use in scheduling semi-persistent resources for side-link communications with at least one wireless node. The UE may transmit a resource map request message indicating preferred resource blocks, where each resource block may be defined by a time and a frequency. The UE may receive a confirmation message that may include a report regarding a set of resource blocks. The set of resource blocks may be from the preferred resource blocks included in the resource map request message. The UE may determine, based, at least in part, on the confirmation message, resource blocks to be used for the side-link communications and initiate the side-link communications using the determined resource blocks.

20 Claims, 17 Drawing Sheets

Related U.S. Application Data

(60) Provisional application No. 62/798,057, filed on Jan. 29, 2019.

(51) Int. Cl.
*H04W 24/10* (2009.01)
*H04W 72/50* (2023.01)
*H04W 88/04* (2009.01)
*H04W 92/18* (2009.01)

(52) U.S. Cl.
CPC ......... *H04W 72/535* (2023.01); *H04W 76/14* (2018.02); *H04W 92/18* (2013.01)

(58) Field of Classification Search
USPC ........................................ 370/252, 280, 329
See application file for complete search history.

(56) References Cited

U.S. PATENT DOCUMENTS

| | | |
|---|---|---|
| 10,251,158 B2 | 4/2019 | Gulati |
| 10,356,803 B2 | 7/2019 | Kim |
| 2016/0198504 A1* | 7/2016 | Seo ..................... H04W 72/044 370/329 |
| 2017/0093508 A1 | 3/2017 | Martin |
| 2018/0035452 A1 | 2/2018 | Yu |
| 2018/0167988 A1 | 6/2018 | Jung |
| 2018/0235027 A1 | 8/2018 | Adachi |
| 2019/0124490 A1* | 4/2019 | Wu ....................... H04W 72/12 |
| 2019/0124653 A1 | 4/2019 | Chae |
| 2020/0092685 A1 | 3/2020 | Fehrenbach |
| 2020/0404560 A1 | 12/2020 | Zhang |
| 2021/0219320 A1* | 7/2021 | Belleschi .............. H04W 72/20 |

* cited by examiner

V2X RESOURCE MAP FOR SEMI-PERSISTENT SCHEDULING WITH UNICAST/GROUPCAST SERVICES

PRIORITY DATA

This application is a continuation of U.S. patent application Ser. No. 16/575,218, entitled "V2X Resource Map for Semi-Persistent Scheduling with Unicast/Groupcast Services," filed Sep. 18, 2019, which claims benefit of priority to U.S. Provisional Application Ser. No. 62/798,057, titled "V2X Resource Map for Semi-Persistent Scheduling with Unicast/Groupcast Services", filed Jan. 29, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to define and use a resource map for resource reservations/scheduling for unicast and/or groupcast communications in V2X (vehicle to everything) networks.

The techniques described herein may be implemented in and/or used with a number of different types of devices, including but not limited to cellular phones, tablet computers, wearable computing devices, portable media players, and any of various other computing devices.

In some embodiments, a wireless device may perform a method for determining resources (semi-persistent and/or dynamic) for scheduling side-link communications. In some embodiments, a user equipment device (UE) may determine a resource map for use in scheduling semi-persistent resources for side-link communications with at least one wireless node (e.g., another UE). The UE may transmit a resource map request message indicating preferred resource blocks, where each resource block may be defined by a time and a frequency. The UE may receive a confirmation message that may include a report regarding a set of resource blocks. The set of resource blocks may be preferred by the at least one wireless node. In some embodiments, the set of resource blocks may have been evaluated for use for the side-link communications. The set of resource blocks may be from the preferred resource blocks included in the resource map request message. The UE may determine, based, at least in part, on the confirmation message, resource blocks to be used for the side-link communications and initiate the side-link communications using the determined resource blocks.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
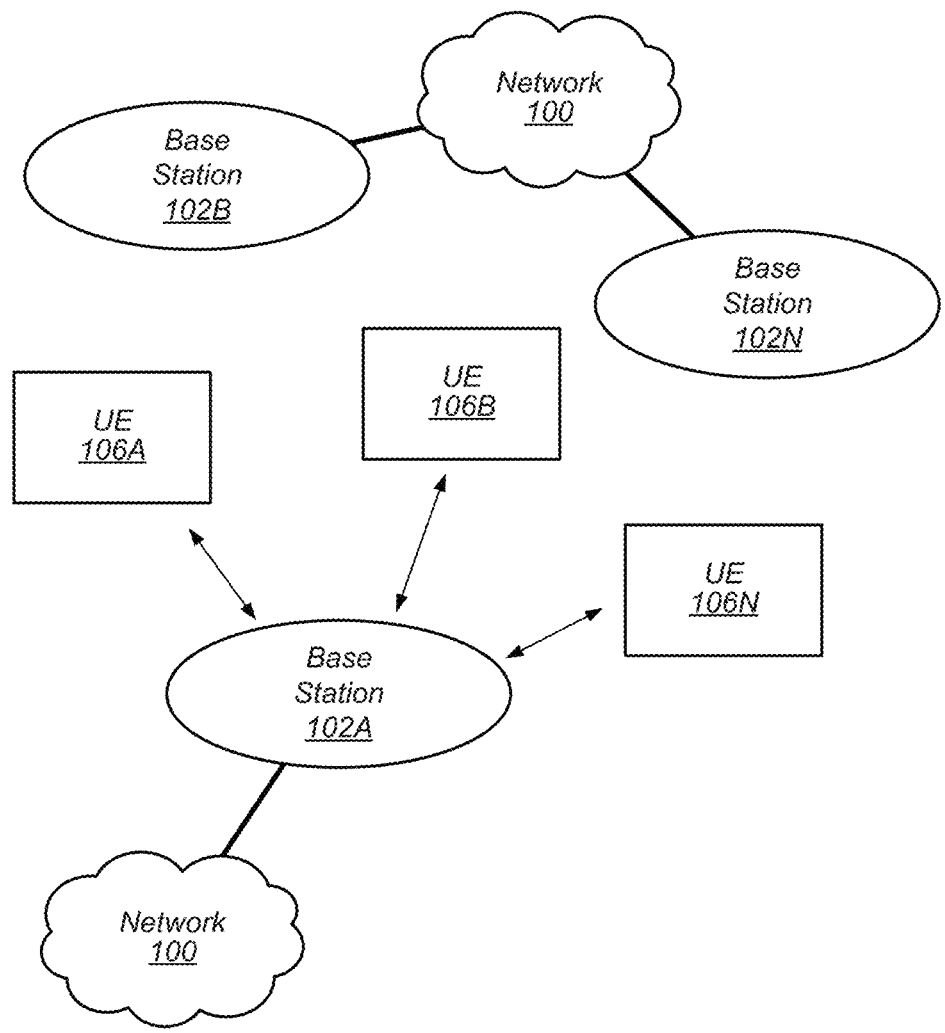
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
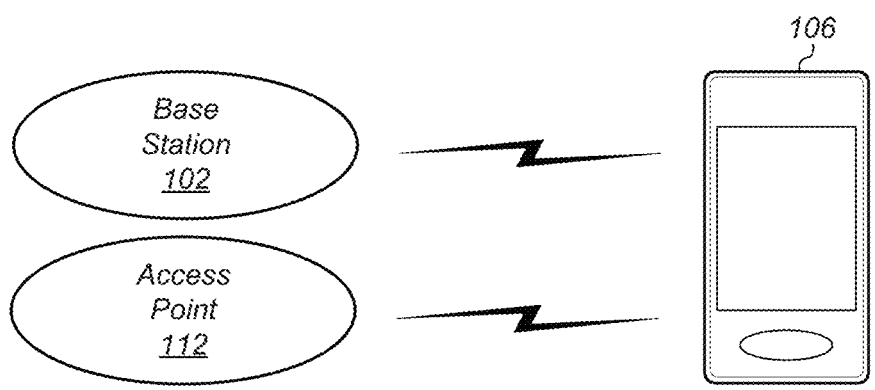
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 2:
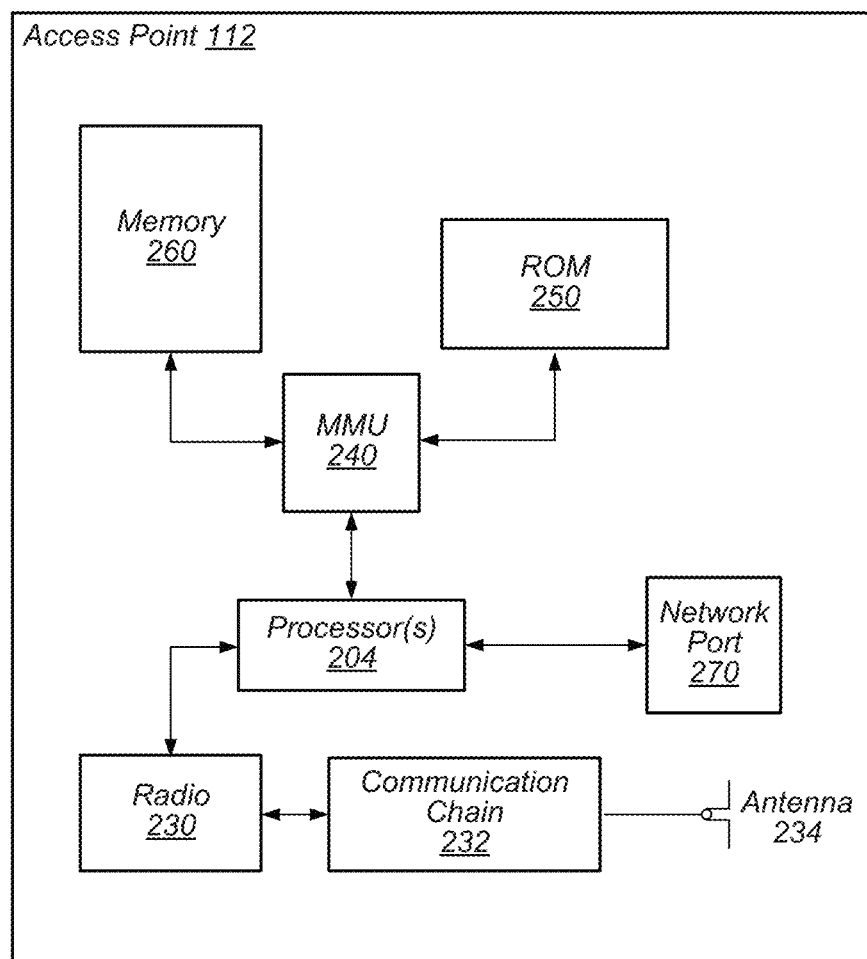
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for defining and using a resource map for semi-persistent resource reservations/scheduling for unicast and/or groupcast communications in V2X (vehicle to everything) networks, e.g., as further described herein.

Figure 3:
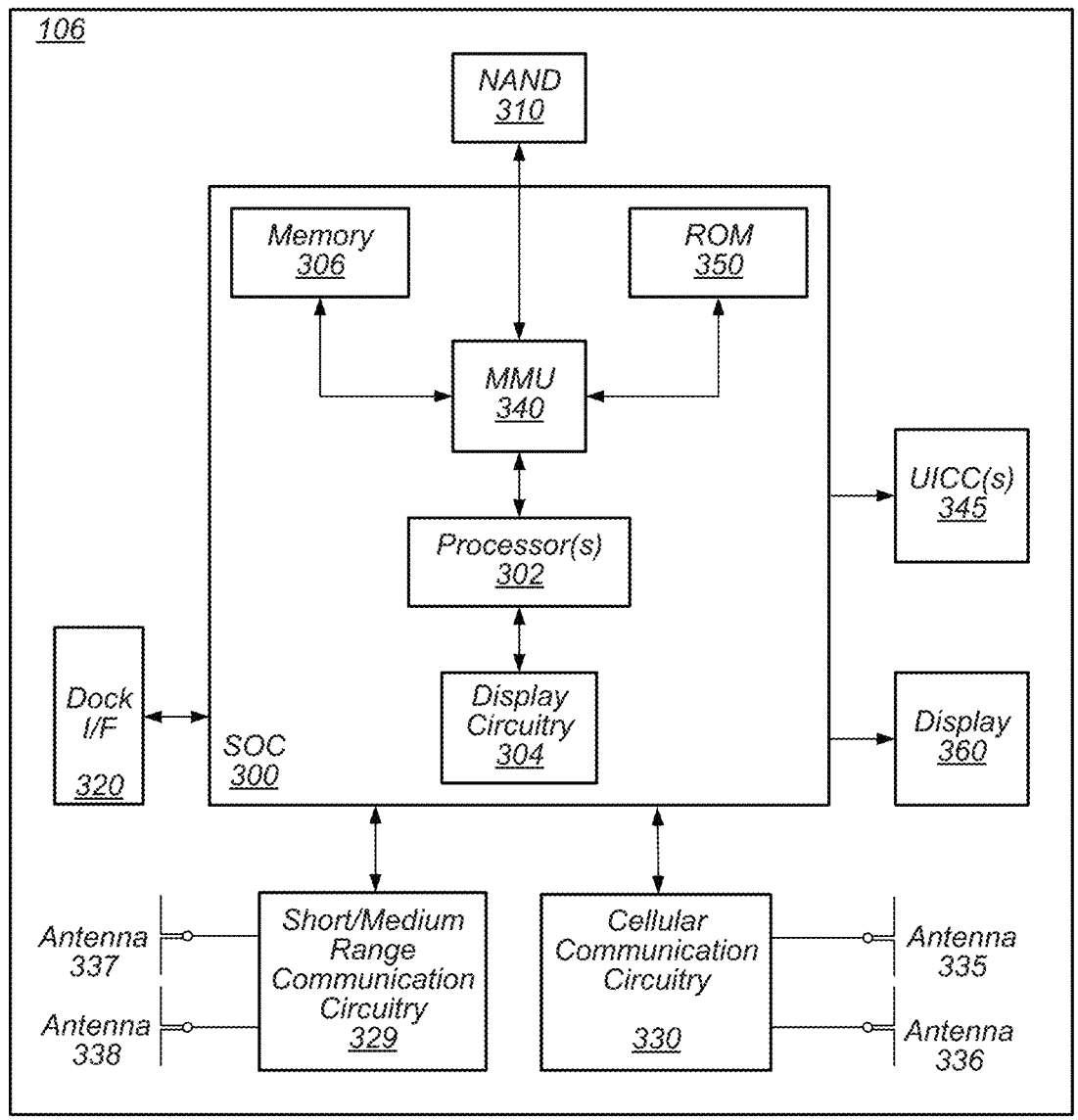
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for defining and using a resource map for semi-persistent resource reservations/scheduling for unicast and/or groupcast communications in V2X (vehicle to everything) networks, e.g., as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short-range wireless communication circuitry 329 may include one or more ICs that are configured to perform the functions of short-to medium range wireless communication circuitry 329. In addition, each integrated circuit may include circuitry (e.g., first circuitry, second circuitry, etc.) configured to perform the functions of short-range wireless communication circuitry 329.

Figure 4:
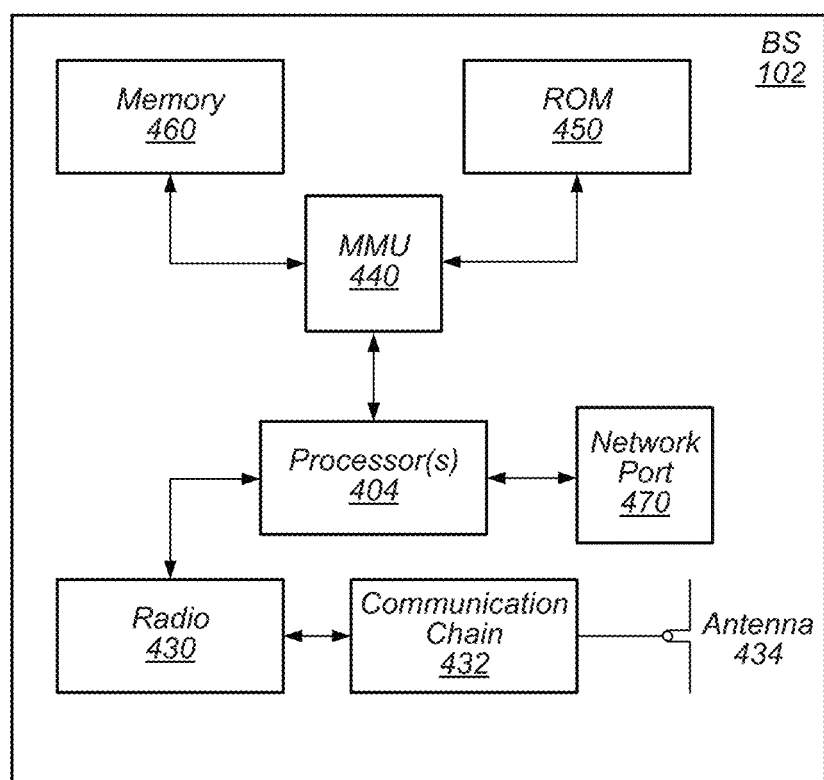
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein, e.g., for defining and using a resource map for semi-persistent resource reservations/scheduling for unicast and/or groupcast communications in V2X (vehicle to everything) networks. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
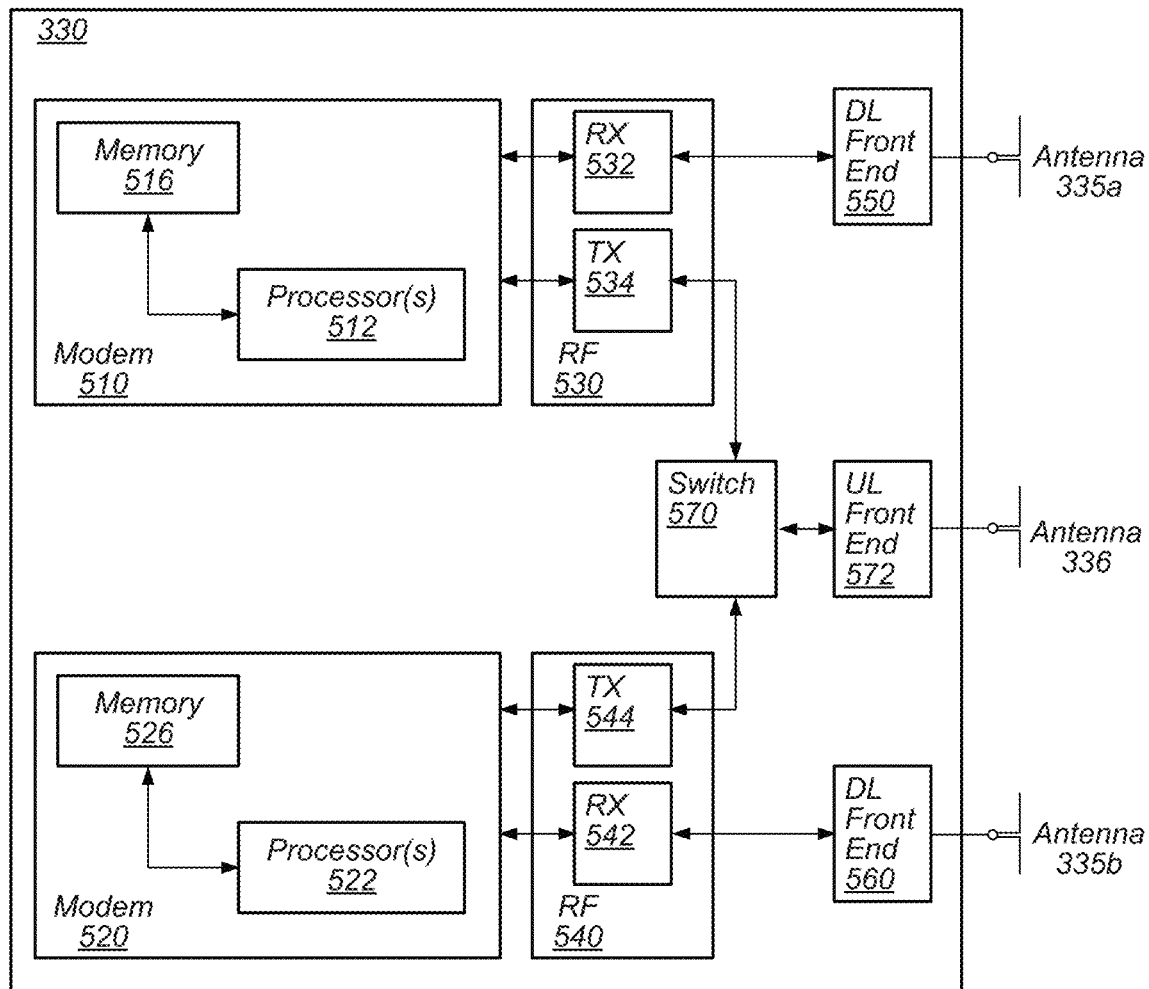
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for defining and using a resource map for semi-persistent resource reservations/scheduling for unicast and/or groupcast communications in V2X (vehicle to everything) networks, e.g., as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
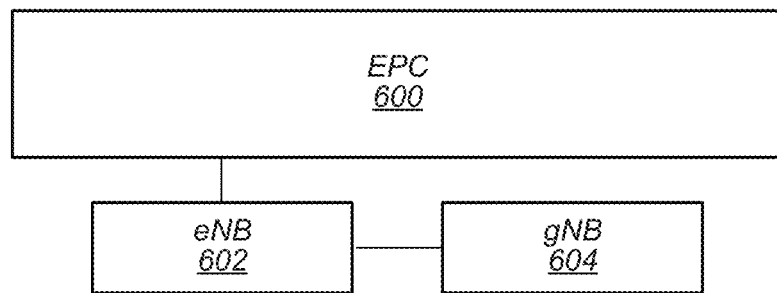
FIG. 6A illustrates an example of connections between an EPC network, an LTE base station (eNB), and a 5G NR base station (gNB).
Figure 6B:
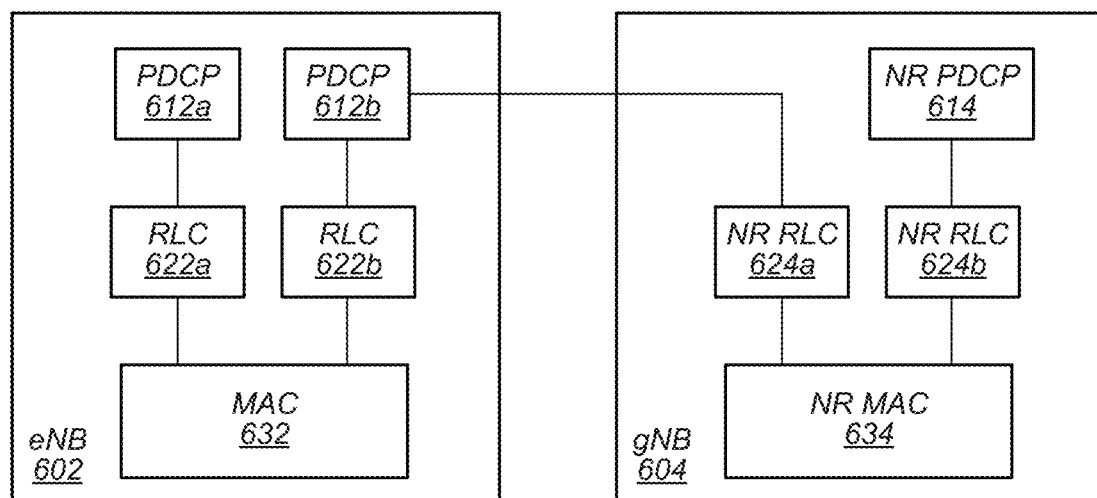
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
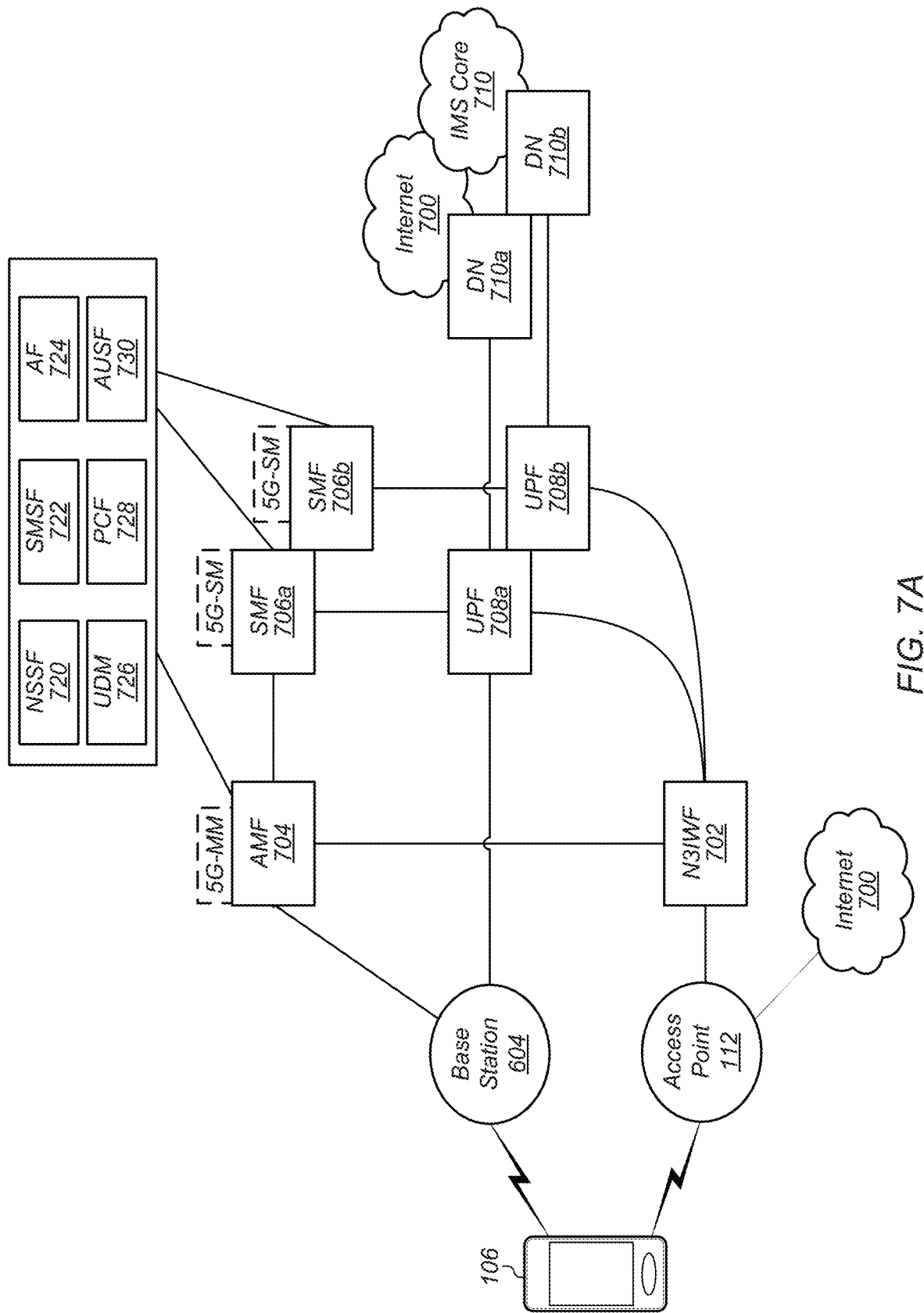
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
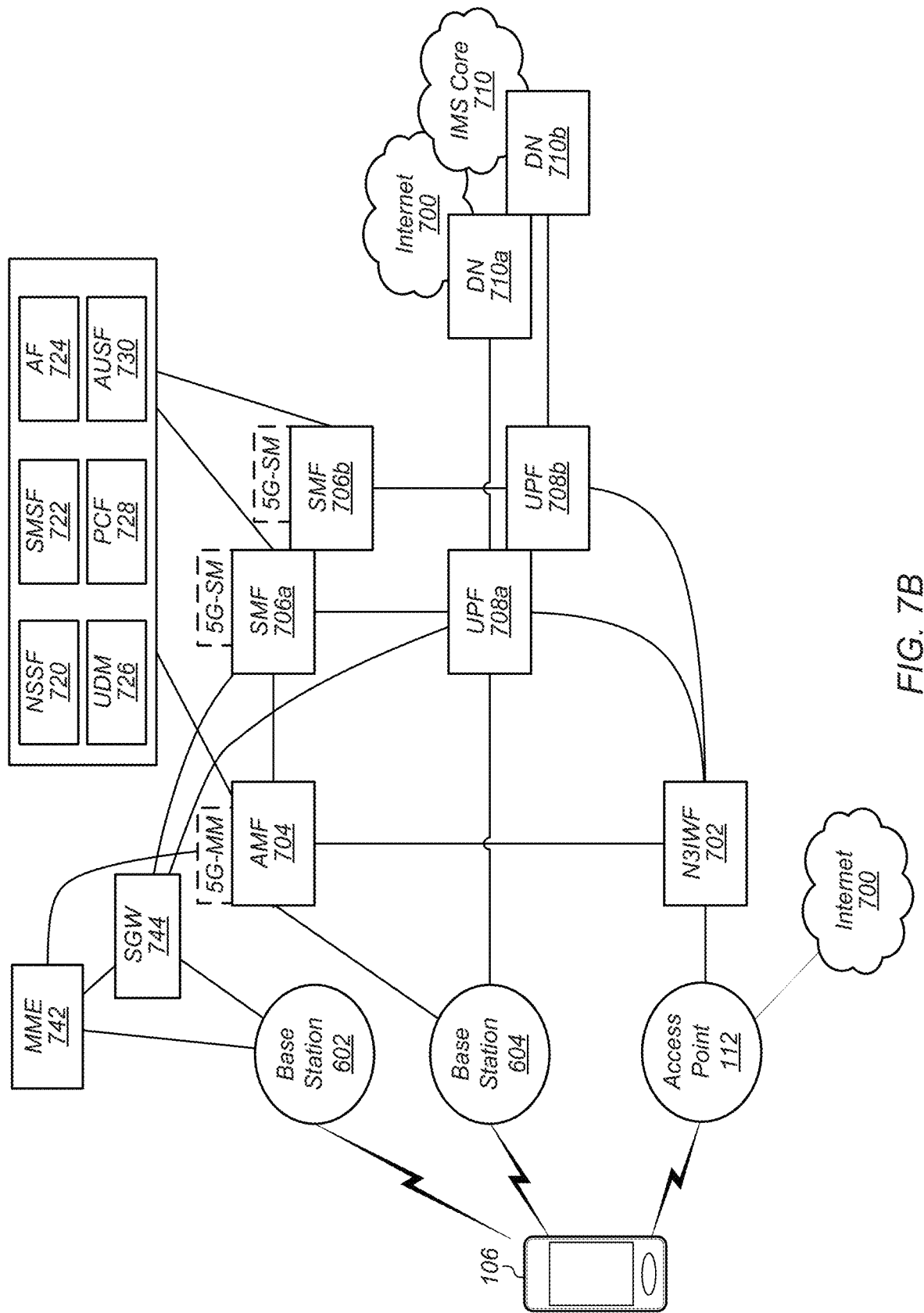
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods to implement mechanisms for autonomous and non-autonomous side-link resource management as well as groupcast side-link resource management, e.g., as further described herein.

Figure 8:
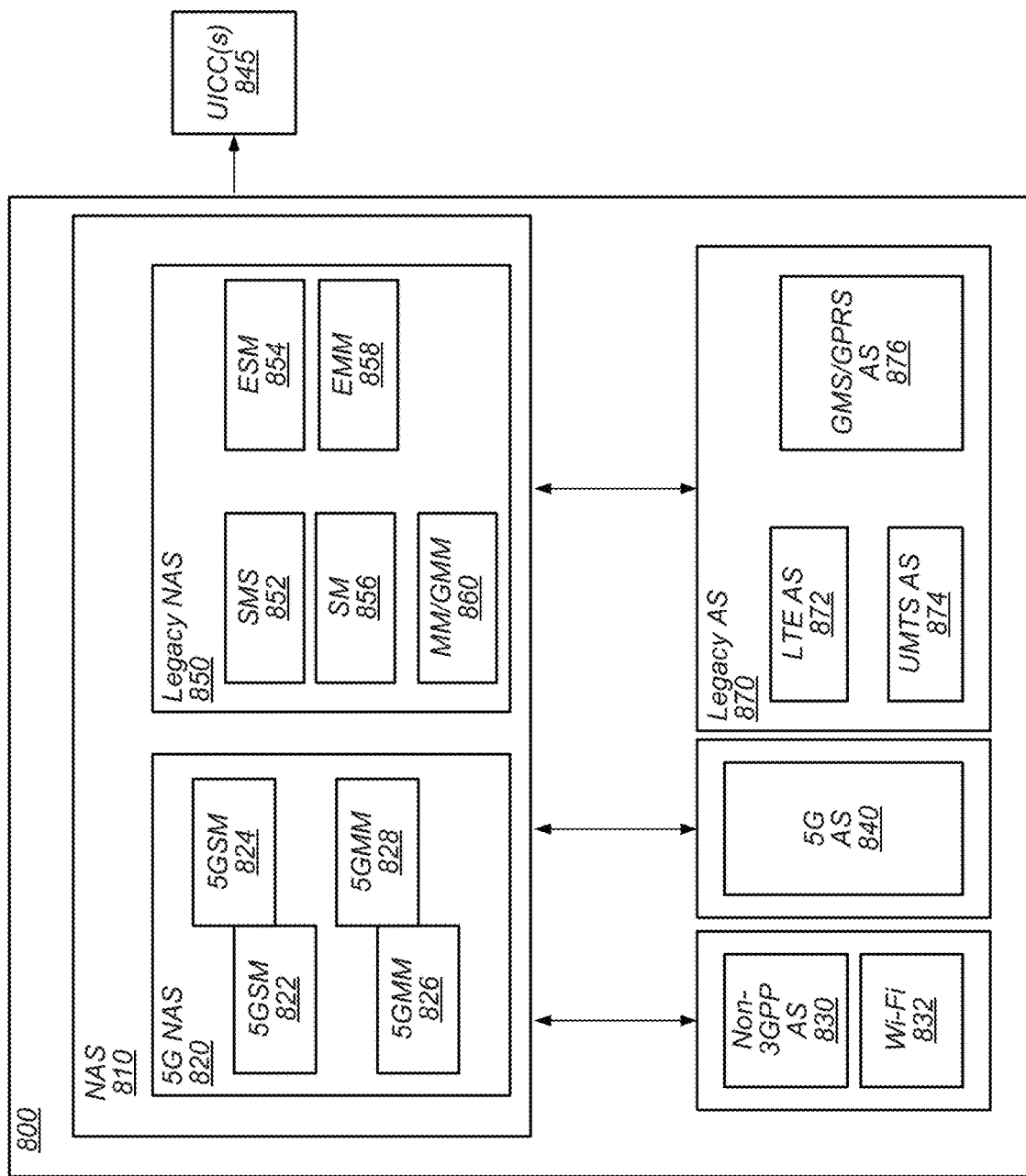
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for autonomous and non-autonomous side-link resource management as well as groupcast side-link resource management, e.g., as further described herein.

Side-Link Resource Management

Figure 9:
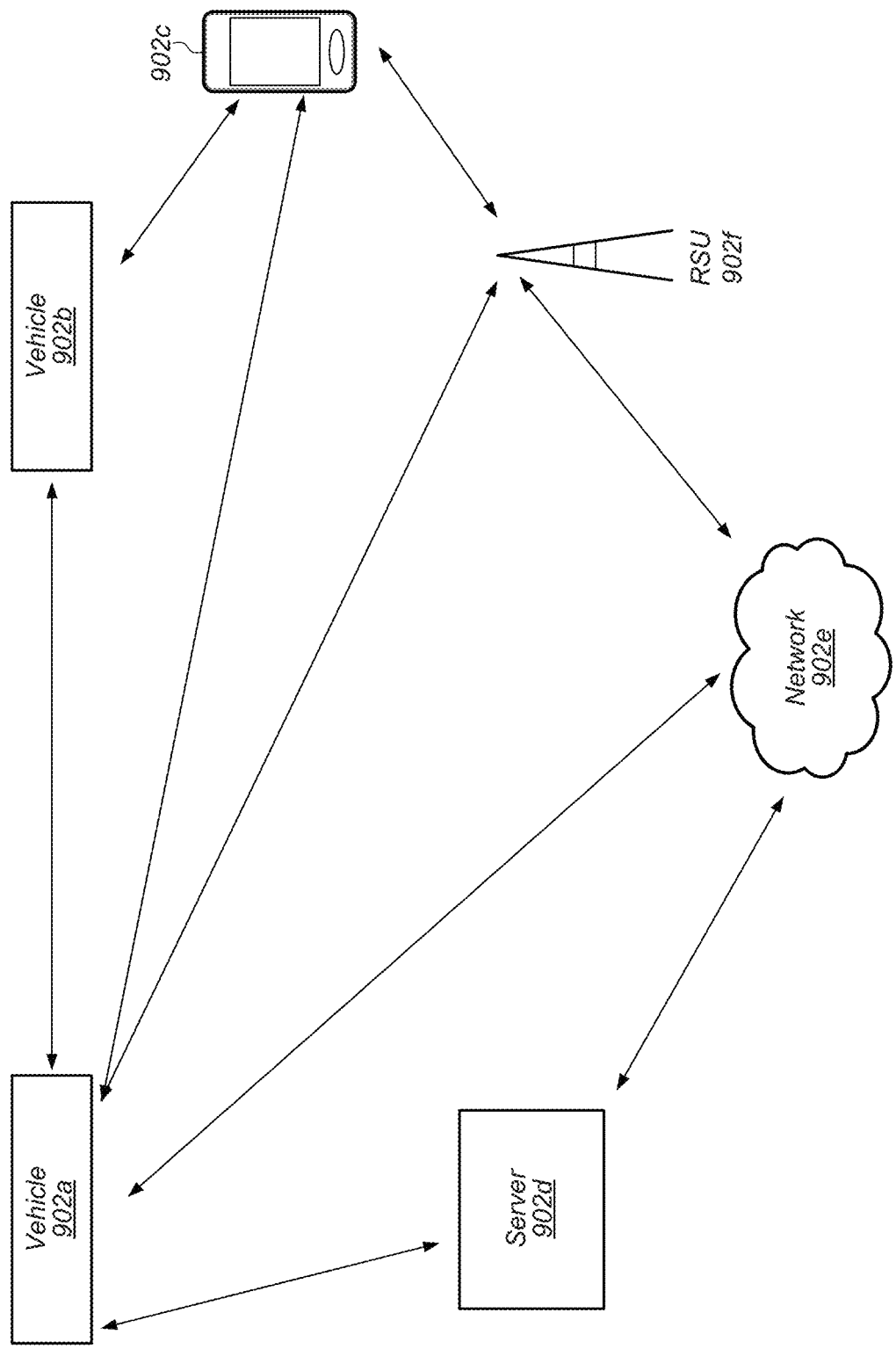
FIG. 9 illustrates an example of a vehicle-to-everything network.

In some existing implementations, vehicle-to-everything (V2X) communications, e.g., as specified by 3GPP TS 22.185 V.14.3.0, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 9, a vehicle, such as vehicle 902a, may communicate with various devices (e.g., devices 902b-f), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHz. Moreover, V2X communications may include unicast, multi-cast, groupcast, and/or broadcast communications. Each communication type may employ an LBT mechanism. Further, under the V2X communication protocol, a transmitter may reserve periodic slots within a reservation period.

Figure 10:
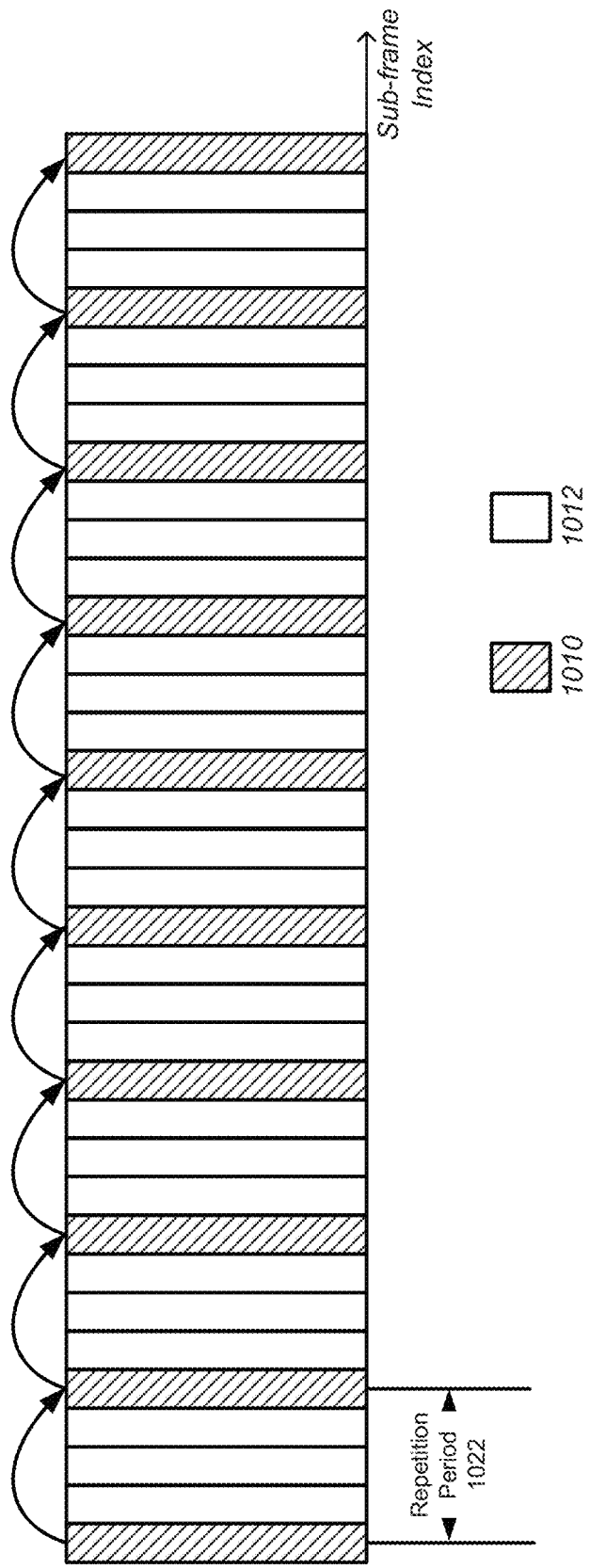
FIG. 10 illustrates an example of semi-persistent resources schedule as part of semi-persistent scheduling.

In some existing implementations, 5G NR V2X may include various scheduling modes. For example, 5G NR V2X mode 2 may be designed for UE self-determination of side-link transmission resources. 5G NR V2X mode 2 includes various sub-modes, including:

Mode 2(a) in which a user equipment device (UE) autonomously selects side-link resources for transmission;

Mode 2(b) in which a UE assists side-link resource selection for other UE(s);

Mode 2(c) in which a UE is configured with NR configured grants (e.g., network defined semi-persistent grants) for side-link transmission; and Mode 2(d) in which a UE schedules side-link transmissions of other UEs. In addition, due to the periodic nature of V2X messaging, existing implementations of V2X may support semi-persistent scheduling (SPS), e.g., configured grant(s). For example, as illustrated by FIG. 10, semi-persistent resources in SPS may represent timely repeated resources across a set of discontinuous sub-frames with a certain repetition periodicity. As shown, semi-persistent resources 1010 may be scheduled across a set of discontinuous sub-frames 1012 with a sub-frame repetition period 1022. Further, existing implementations of SPS (e.g., LTE V2X) and its corresponding resource allocation design are optimized for broadcast service. However, 5G NR V2X mode 2 additionally supports both unicast and groupcast services. Thus, there is a strong need to enhance methods that aid semi-persistent resource allocation for unicast service and groupcast service in 5G NR V2X mode 2.

Embodiments described herein provide mechanisms for defining and using a resource map for semi-persistent and/or dynamic resource reservations/scheduling for unicast and/or groupcast communications in V2X (vehicle to everything) networks. In some embodiments, resource map based messages that can be exchanged between transmit and receive nodes may be introduced. In some embodiments, the resource maps may be exchanged for unicast service. In some embodiments, resource maps may be used as feedback in groupcast services. Additionally, in some embodiments, a resource map oriented report may be used for channel state and/or mobility measurement.

Figure 11:
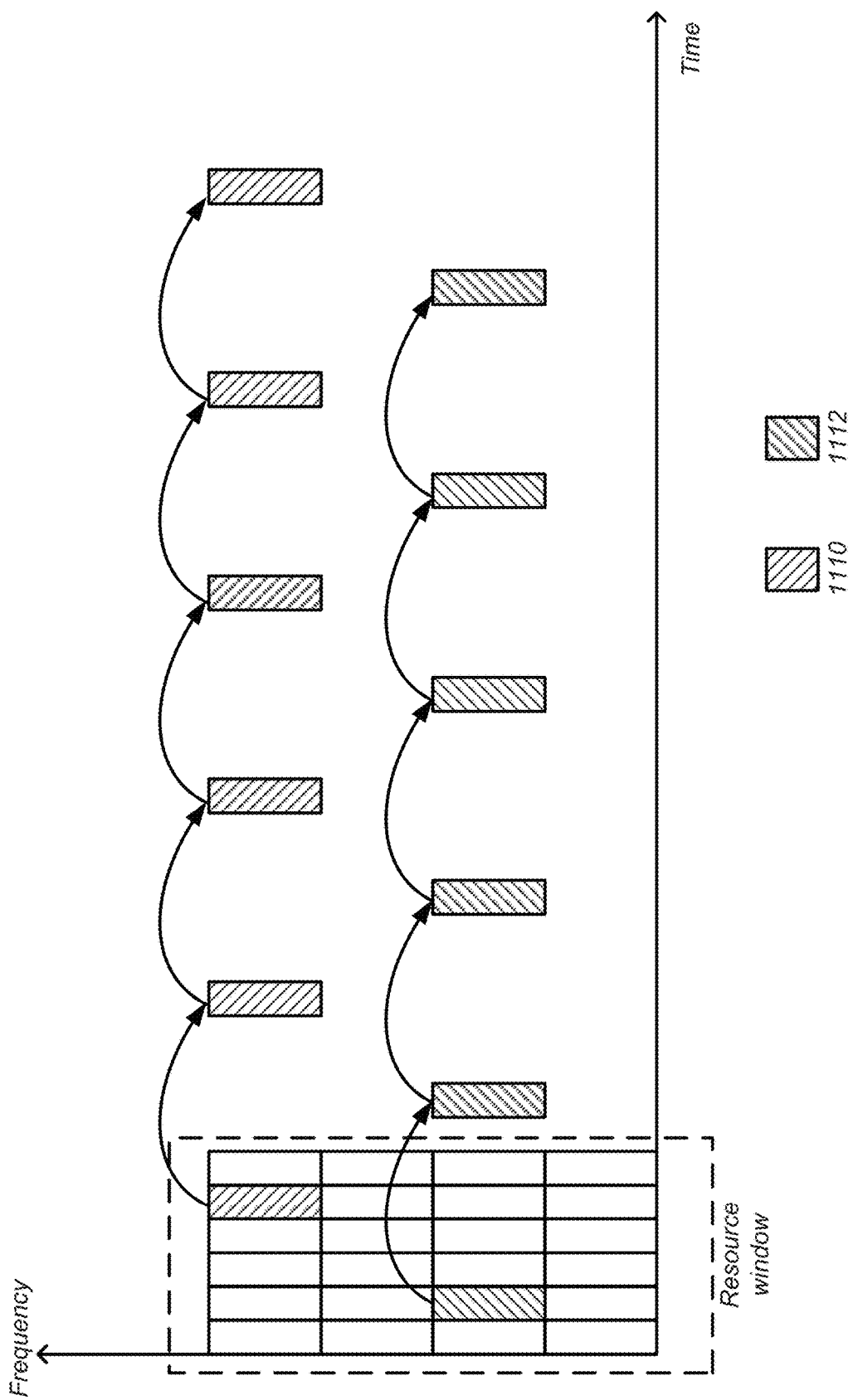
FIGS. 11 and 12 illustrate examples of semi-persistent resources declared within a resource window, according to some embodiments.
Figure 12:
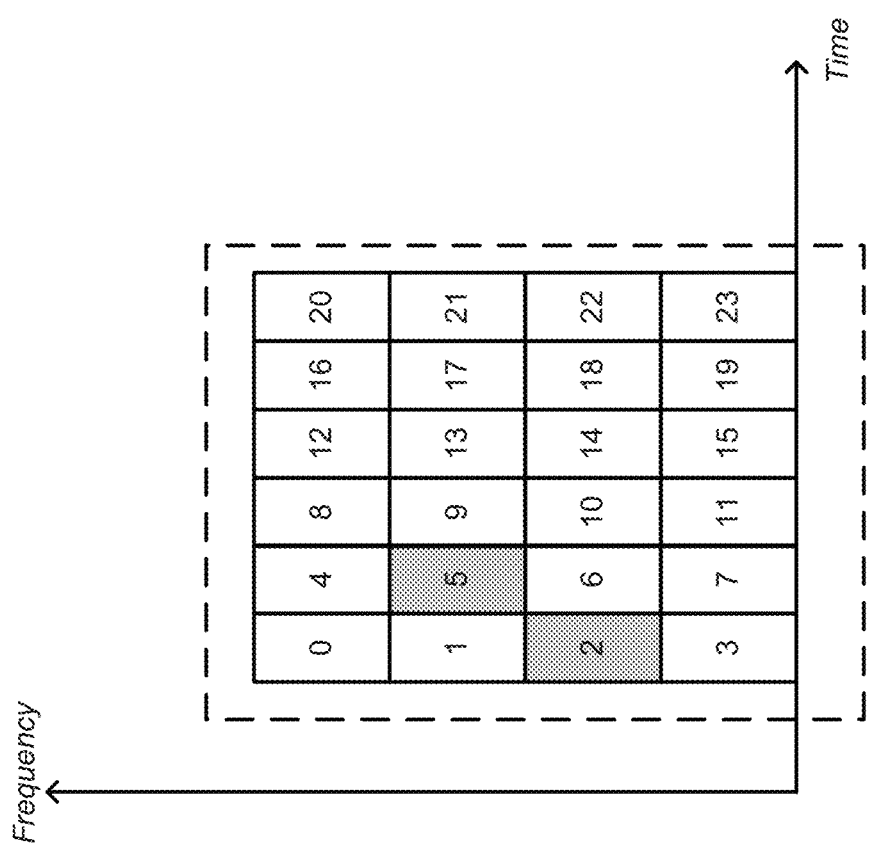

In some embodiments, resources (semi-persistent and/or dynamic) may be formulated within a resource window, e.g., as illustrated by FIGS. 11 and 12. A resource window may represent a number of time-frequency blocks, each time-frequency block of the resource window denoting one base resource unit. Additionally, the time-frequency blocks of the resource window may be formulated as a resource set. In some embodiments, for a given service, a transmit node may select a subset of time-frequency blocks (e.g., such as time-frequency blocks 1110 and 1112 of FIG. 11) from the resource window. Further, as a semi-persistent resource, the selected subset of time-frequency blocks may be repeated a specified number of times in the time domain with a specified periodicity. In some embodiments, a resource map may be defined as a message that describes (or includes/indicates) which time-frequency blocks of a resource window are selected by a transmit node. In some embodiments, the resource map may also contain (or include/describe/indicate) a periodicity of the selected time-frequency blocks for semi-persistent scheduling. In some embodiments, as illustrated by FIG. 12, each time-frequency block of a resource window may be associated with (or identified by/indicated by) an index. In some embodiments, the resource map may be specified by a bitmap. For example, a binary bit vector may represent time-frequency blocks (e.g., resource blocks) within the resource window. In some embodiments, a value of 1 may indicate that a corresponding resource block is declared whereas a value of 0 may indicate that a corresponding resource block is not declared. For example, a bitmap of [0, 0, 1, 0, 0, 1] may represent the declared (shaded) resource blocks as illustrated in FIG. 12. In other words, the bitmap of [0, 0, 1, 0, 0, 1] may indicate that resource blocks 2 and 5 are declared (or selected). In some embodiments, the resource map may be specified via an explicit listing of indices associated with declared resource blocks. For example, an array {2, 5} may represent the declared (shaded) resource blocks as illustrated in FIG. 12. In other words, the array {2, 5} may indicate that resource blocks 2 and 5 are declared (or selected).

Figure 13:
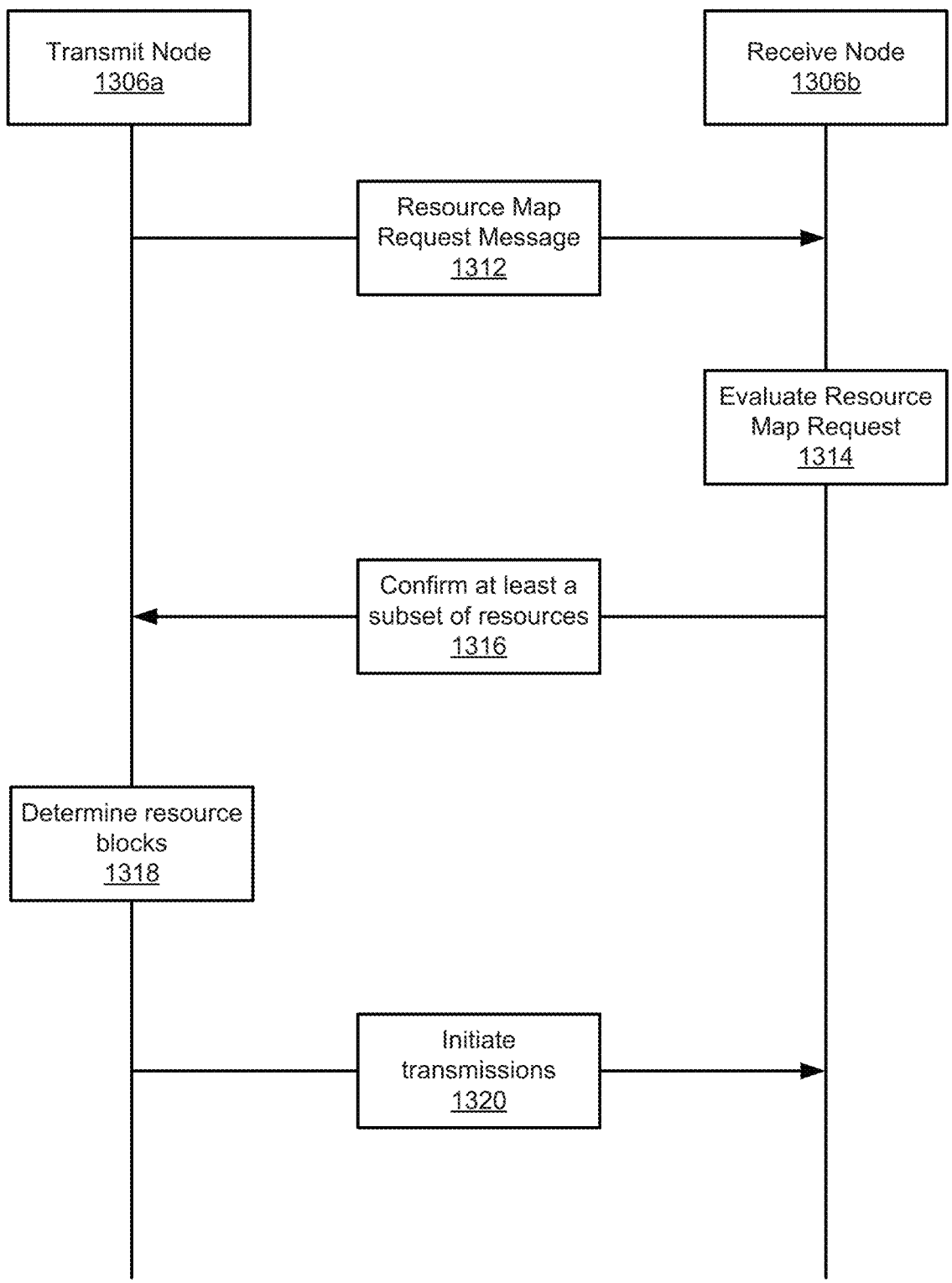
FIG. 13 illustrates a block diagram of an example of signaling between transmit and receive nodes for negotiating a set of resource blocks for use in side-link communications, according to some embodiments.

In some embodiments, transmit and receive nodes may exchange resource map information to negotiate and agree upon a set of resource blocks to be used for unicast side-link communications. For example, FIG. 13 illustrates a block diagram of an example of signaling between transmit and receive nodes for negotiating a set of resource blocks for use in side-link communications, according to some embodiments. The signaling shown in FIG. 13 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

The signaling may be initiated by a transmit node 1306a, which may be a UE 106, once the transmit node 1306a determines an initial resource map (e.g., as defined above) for use in side-link communications with a receive node 1306b, which may also be a UE 106. The transmit node 1306a may transmit a resource map request message 1312 that may include (or indicate) a listing of transmit node 1306a's preferred resource blocks. At 1314, the receive node 1306b may evaluate resource blocks indicated by resource map request message 1312. In some embodiments, the receive node 1306b may select a subset of the resource blocks indicated by the resource map request message 1312 based on one or more criteria. For example, the receive node 1306b may evaluate downlink quality metrics of each resource block indicated by the resource map request message 1312. In some embodiments, the downlink quality metrics may include any, any combination of, and/or all of signal to noise ratio (SNR) of each resource block, reference signal receive power (RSRP) of each resource block, total received signal strength (RSSI) of each resource block, relative received signal strength (RSRQ) for each resource block, expected data rate for each resource block in terms of (or based on) at least one of channel quality indicator (CQI), rank indicator (RI), and/or pre-coding matrix indicator (PMI), scheduling ratio of each resource block, and/or collision probability of each resource block. Note that other metrics may be used as well.

After evaluation of the resource blocks indicated by the resource map request message 1312, the receive node 1306b may determine a preferred set of resource blocks and may transmit a confirmation message 1316 to transmit node 1306a. The confirmation message 1316 may indicate which resource blocks (from the indicated resource blocks) the receive node 1306b would like to use for side-link communications (e.g., which resource blocks the receive node 1306 prefers). At 1318, the transmit node 1306a may determine resource blocks to be used for the side-link communication based, at least in part, on the confirmation message 1316. Subsequently, at 1320, the transmit node 1306a may initiate side-link transmissions with receive node 1306b using the determined resource blocks. Note that if the confirmation message is not received and/or does not include any resource blocks (e.g., none of the resource blocks indicated by resource map request message 1312 are evaluated as useable by receive node 1306b), the transmit node 1306a may re-initiate the signaling instead of initiating side-link transmissions.

In some embodiments, a resource map may be implemented as a feedback mechanism for group-cast side-link communication scheduling. For example, a transmit node may transmit a resource map request message to multiple receive nodes. The resource map request message may include a listing of preferred resource blocks (e.g., as described above). The receive nodes may provide feedback information regarding quality and/or preference of the listed preferred resource blocks. Based on the feedback, the transmit node may adjust/refine resource blocks to be used for the groupcast side-link communications. However, depending on a number of receive nodes in a groupcast, aggregated feedback overhead may become an issue for the transmit device. Thus, in some embodiments, overhead in groupcast may be reduced via various mechanisms (and/or combinations of mechanisms), such as selecting a limited number of representative receive nodes, inclusive/exclusive reporting, and/or reporting long term downlink metrics with relaxed reporting periodicity.

Figure 14A:
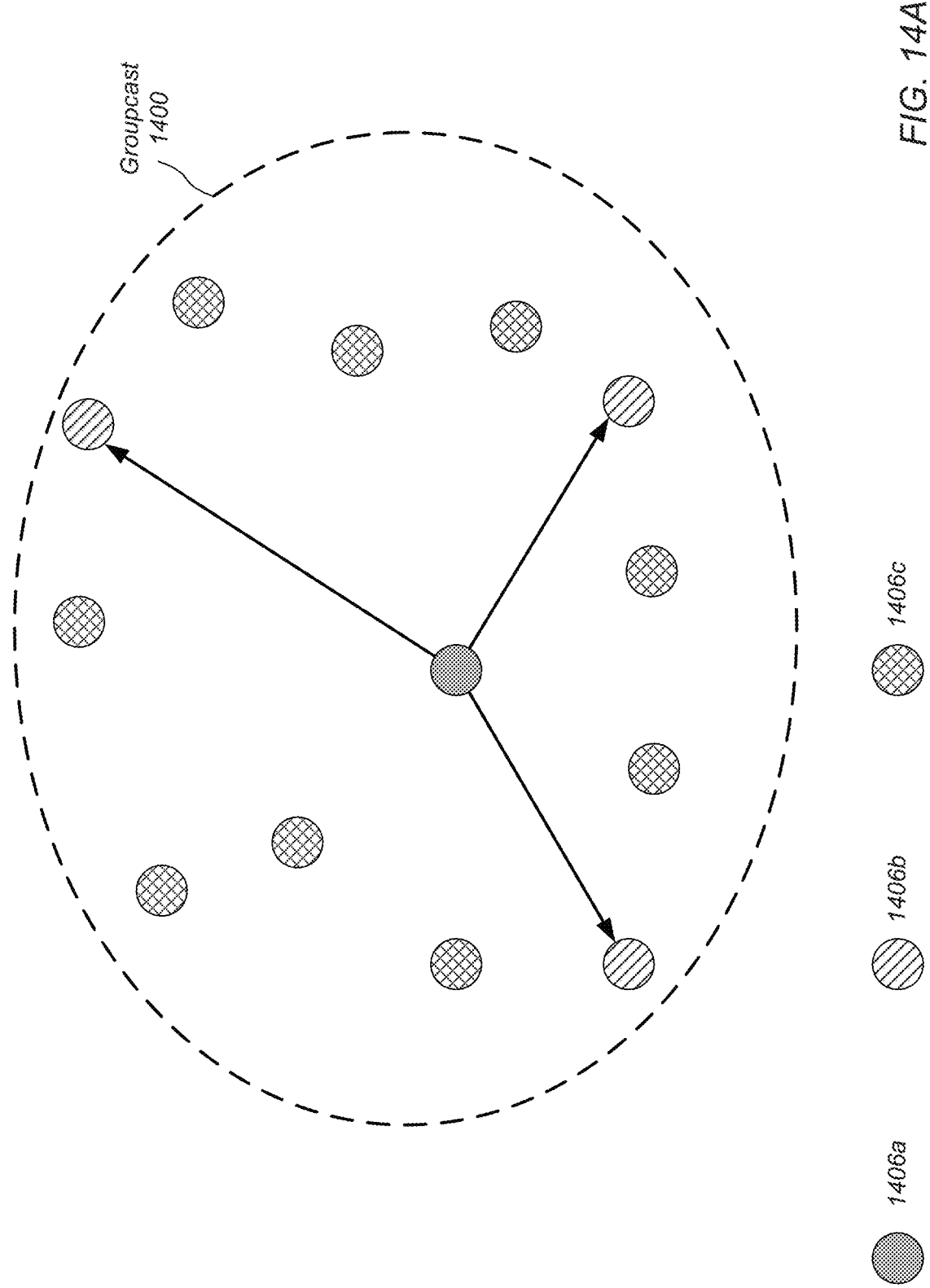
FIGS. 14A-B illustrate an example of selection of a representative group of receive nodes by a transmit node to provide feedback regarding semi-persistent scheduling of a groupcast, according to some embodiments.
Figure 14B:
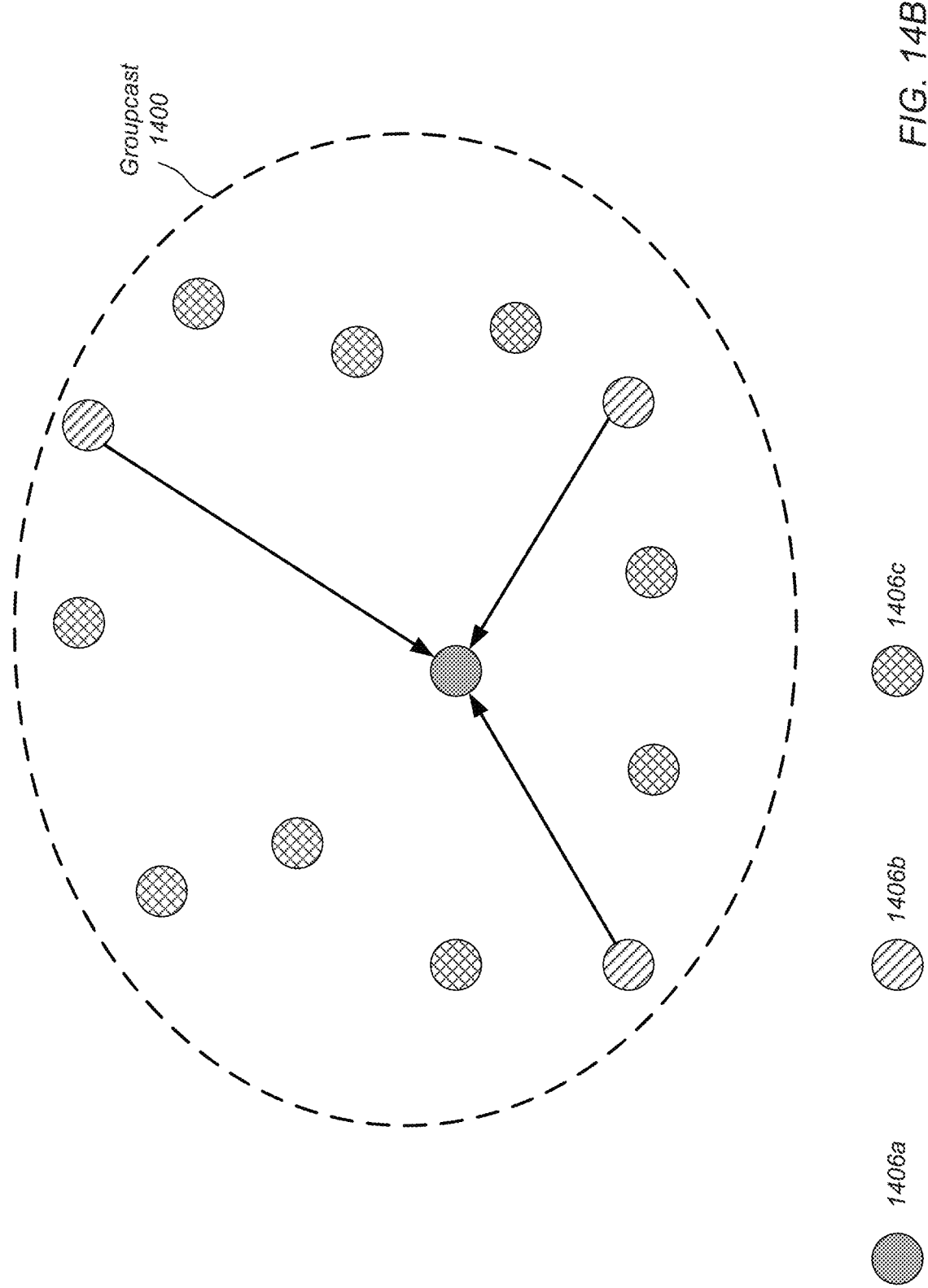

For example, as illustrated by FIGS. 14A and 14B, a representative group of receive nodes may be selected by a transmit node to provide feedback regarding semi-persistent scheduling of a groupcast. In other words, instead of letting all receive nodes within a groupcast provide feedback, a transmit node may nominate (or select) a subset (e.g., a limited number) of receive nodes that may serve as representative of downlink channel conditions. The subset of receive nodes may then provide feedback regarding resource blocks to use for the groupcast. For example, as illustrated by FIG. 14A, a transmit node 1406a, which may be a UE 106, may transmit a resource map request message that may include (or indicate) a listing of transmit node 1406a's preferred resource blocks to a subset of receive nodes (e.g., nodes 1406b, which may also be UEs 106) within a groupcast 1400. Note that groupcast 1400 may include transmit node 1406a as well as representative receive nodes 1406b and receive nodes 1406c (which may also be UEs 106). Upon receiving the resource map request massage, each representative receive node 1406b may evaluate resource blocks indicated by the resource map request message. In some embodiments, each representative receive node 1406b may select a subset of the resource blocks indicated by the resource map request message based on one or more criteria. For example, each representative receive node 1406b may evaluate downlink quality metrics of each resource block indicated by the resource map request message. In some embodiments, the downlink quality metrics may include any, any combination of, and/or all of signal to noise ratio (SNR) of each resource block, reference signal receive power (RSRP) of each resource block, total received signal strength (RSSI) of each resource block, relative received signal strength (RSRQ) for each resource block, expected data rate for each resource block in terms of (or based on) at least one of channel quality indicator (CQI), rank indicator (RI), and/or pre-coding matrix indicator (PMI), scheduling ratio of each resource block, and/or collision probability of each resource block. Note that other metrics may be used as well. Upon evaluation of the resource blocks indicated by the resource map request message, each representative receive node 1406b may provide feedback (e.g., preferred resource blocks) to transmit node 1406a as shown in FIG. 14B. In some embodiments, based on the feedback, the transmit node 1406a may determine a semi-persistent schedule for the groupcast 1400.

In some embodiments, a receive node (e.g., such as, but not limited to, representative receive nodes 1406b) may choose its feedback reporting mode to minimize overhead. For example, the receive node may choose to report an inclusive set (e.g., report a subset of resource blocks that are strongly preferred by the receive node) or an exclusive set (e.g., report a subset of resource blocks that are strongly not preferred by the receive node). In some embodiments, determination of which set to report as feedback may be based on an evaluation of each resource block included in a resource map request message, e.g., as described above with reference to FIG. 13, as well as which set has less feedback overhead.

In some embodiments, a receive node within a groupcast may only report long-term downlink metrics (e.g., rather than short-term metrics), thereby reducing feedback overhead of a groupcast. In some embodiments, the transmit node may interleave reporting schedules of receive nodes in the time domain to further reduce feedback overhead.

In some embodiments, channel state and mobility measurements may be exchanged between transmit and receive nodes to support side-link unicast/groupcast communications. However, it may not be efficient to report quality of all resource blocks within a resource window. For example, if a UE only reports a wideband metric covering all resource blocks, the UE may not have resolution of each block's quality. On the other hand, if the UE reports per-block quality, overhead may be increased and the UE may unnecessarily report on resource blocks a transmit node does not intend to adopt. Hence, in some embodiments, for channel state/mobility measurements, a resource map message (e.g., as described above) may be implemented by a transmit node to distinguish/indicate:

(1) which subset of resource blocks to measure and report;
(2) type of information/metric to report; and/or
(3) triggering condition for the report.

For example, in some embodiments, a transmit node, such as UE 106 (and/or transmit node 1306a/1406a), may list/indicate in a resource map message which subset of resource blocks may require reporting (e.g., feedback from a receiver node). As another example, a transmit node, such as UE 106 (and/or transmit node 1306a/1406a), may list/indicate in a resource map message which downlink metrics for each indicated resource block may be reported. In some embodiments, downlink metrics may include any, any combination, and/or all of RSRP, RSSI, SNR, interference level, channel occupation ration, and so forth. As a further example, a transmit node, such as UE 106 (and/or transmit node 1306a/1406a), may define (and/or further define) a triggering condition of a report. In some embodiments, the trigger condition may include a specified downlink metric exceeding a threshold for a period of time (e.g., as defined through a timer).

Figure 15:
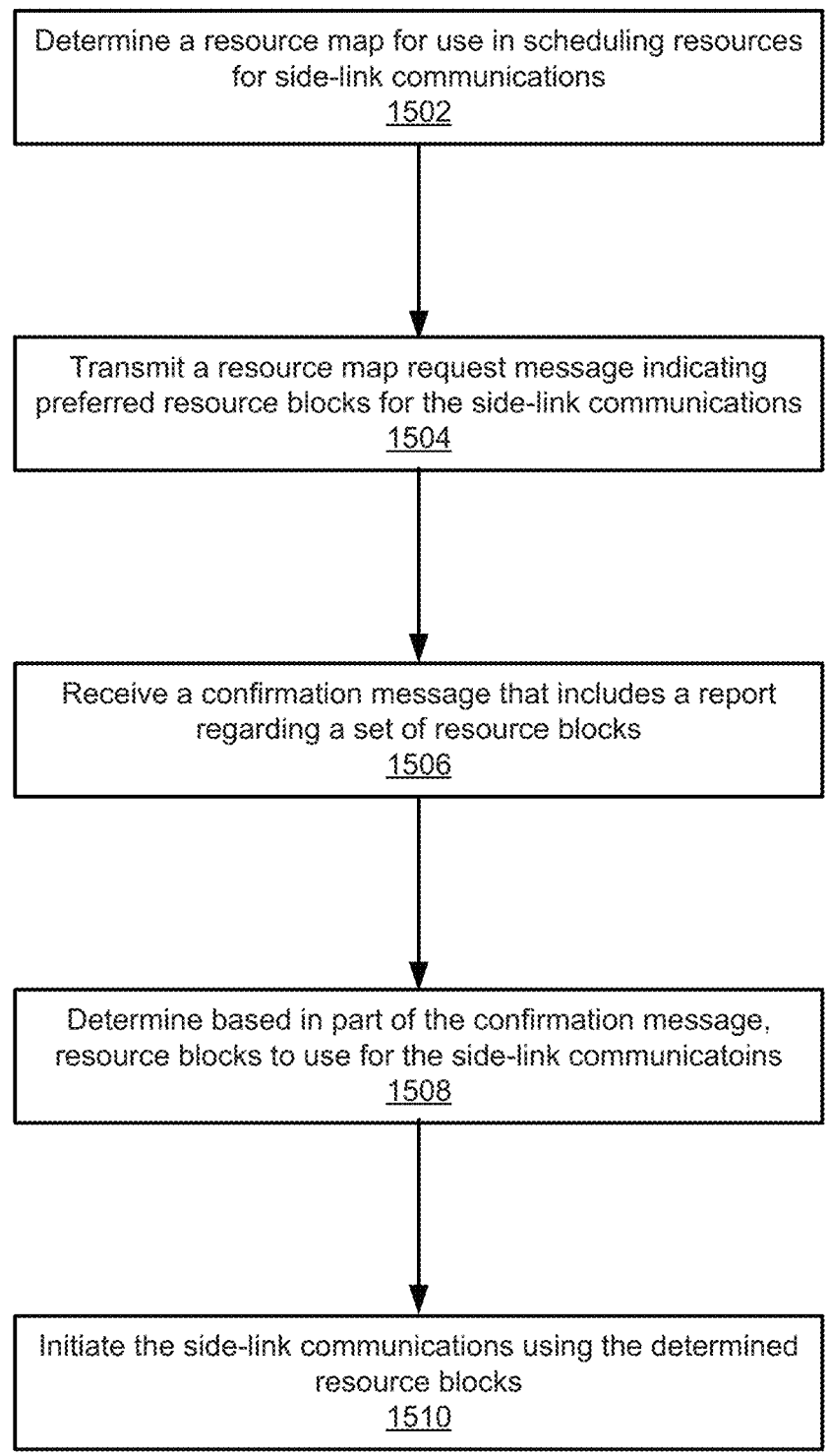
FIG. 15 illustrates a block diagram of an example of a method for negotiating a set of resource blocks for use in side-link communications, according to some embodiments.

FIG. 15 illustrates a block diagram of an example of a method for negotiating a set of resource blocks for use in side-link communications, according to some embodiments. The method shown in FIG. 15 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1502, a wireless node, such as UE 106, may determine a resource map for use in scheduling resources for side-link communications with a neighboring wireless node(s). The resources may be semi-persistent and/or dynamic resources. In some embodiments, the side-link communication may be a unicast communication. In some embodiments, the side-link communication may be a groupcast communication. In such embodiments, the neighboring wireless node(s) may be a representative wireless node.

At 1504, the wireless node may transmit a resource map request message to the neighboring wireless node(s). The resource map request message may indicate preferred resource blocks for use in the side-link communications. In some embodiments, a resource block may be defined by a time and a frequency. In some embodiments, the preferred resource blocks may be indicated via one of a bitmap or an array of indices. In some embodiments, the resource map request message may include a periodicity of the preferred resource blocks. In some embodiments, the resource map request message may include an indication of which resource blocks the wireless node requests channel state and/or mobility measurement information. In some embodiments, the resource map request message may include an indication of which downlink metrics for each indicated resource block to include in a report regarding a set of resource blocks of the preferred resource blocks indicated in the resource map request message. In some embodiments, the resource map request message may include a triggering threshold for triggering a report of downlink channel conditions. In some embodiments, the threshold may include both a threshold value and a period of time a metric is required to exceed the threshold value to trigger the report of downlink channel conditions.

At 1506, the wireless node may receive a confirmation message from the neighboring wireless node(s). The confirmation message may include a report regarding a set of resource blocks of the preferred resource blocks indicated in the resource map request message. In some embodiments, the report regarding the set of resource blocks of the preferred resource blocks may be based, at least in part, on one or more downlink quality metrics for each of the preferred resource blocks. In some embodiments, the downlink quality metrics may include one or more of (and/or any, any combination of, and/or all of) signal to noise ratio (SNR) of each resource block, reference signal receive power (RSRP) of each resource block, total received signal strength (RSSI) of each resource block, relative received signal strength (RSRQ) for each resource block, expected data rate for each resource block in terms of (or based on) at least one of channel quality indicator (CQI), rank indicator (RI), and/or pre-coding matrix indicator (PMI), scheduling ratio of each resource block, and/or collision probability of each resource block. Note that other metrics may be used as well. In some embodiments, the report regarding the set of resource blocks of the preferred resource blocks may include one of an inclusive set of resource blocks or an exclusive set of resource blocks. In some embodiments, the inclusive set of resource blocks may include resource blocks preferred by the neighboring wireless node(s). In some embodiments, the exclusive set of resource blocks may include resource blocks that are not preferred by the neighboring wireless node(s).

At 1508, the wireless node may determine, based, at least in part, on the confirmation message, resource blocks to be used for the side-link communications with the neighboring wireless node(s).

At 1510, the wireless node may initiate the side-link communications with the neighboring wireless node(s) using the determined resource blocks. In some embodiments, the side-link communication may be a unicast communication. In some embodiments, the side-link communication may be a groupcast communication. In such embodiments, the neighboring wireless node(s) may be a representative wireless node. Further, in some embodiments in which the side-link communication may be a groupcast communication, the wireless node may receive a second confirmation message from another (or additional) neighboring wireless node(s). The second confirmation message may include a second report regarding a set of resource blocks of the preferred resource blocks indicated in the resource map request message. In such embodiments, determination of the resource blocks to be used for the side-link communications may be further based on the second confirmation message.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform communication using at least one radio access technology (RAT);
   one or more processors coupled to the at least one radio, wherein the one or more processors and the at least one radio are configured to perform communications;
   wherein the one or more processors are configured to cause the UE to:
   determine at least one reference signal received power (RSRP) for a first set of resource blocks of a plurality of resource blocks;
   determine a second set of resource blocks out of the first set of resource blocks based on the determined at least one RSRP, wherein the second set of resource blocks is a subset of the first set of resource blocks;
   transmit, to a second UE, a message including an indication of the second set of resource blocks based on the determined at least one RSRP; and
   receive a transmission from the second UE in resource blocks based on the message, wherein the resource blocks are selected based the second set of resource blocks.

2. The UE of claim 1,
   wherein, to determine the second set of resource blocks out of the first set of resource blocks, the one or more processors are further configured to cause the UE to determine the second set of resource blocks out of the first set of resource blocks based on respective RSRP being determined to satisfy a threshold.

3. The UE of claim 2,
   wherein the threshold includes a threshold value and a period of time the respective RSRP is required to exceed the threshold value.

4. The UE of claim 1,
   wherein the indication of the second set of resource blocks is a bitmap indicating the second set of resource blocks.

5. The UE of claim 1,
   wherein the indication of the second set of resource blocks is an array of indices indicating the second set of resource blocks.

6. The UE of claim 1,
   wherein the message further includes a periodicity of the second set of resource blocks.

7. The UE of claim 1,
   wherein the one or more processors are further configured to cause the UE to:
   choose whether to report either preferred resource blocks or non-preferred resource blocks.

8. The UE of claim 1,
   wherein the second set of resource blocks are preferred resource blocks.

9. The UE of claim 8,
   wherein the UE chooses to report the preferred resource blocks.

10. The UE of claim 1,
    wherein the second set of resource blocks are non-preferred resource blocks.

11. The UE of claim 10,
    wherein the UE chooses to report the non-preferred resource blocks.

12. A method for determining resource blocks for transmissions, comprising:
    determining at least one reference signal received power (RSRP) for a first set of resource blocks of a plurality of resource blocks;
    determining a second set of resource blocks out of the first set of resource blocks based on the determined at least one RSRP, wherein the second set of resource blocks is a subset of the first set of resource blocks;
    transmitting, to a neighboring user equipment device (UE), a message including an indication of a second set of resource blocks based on the determined at least one RSRP; and
    receiving a transmission from the neighboring UE in resource blocks based on the message.

13. The method of claim 12,
    wherein determining the second set of resource blocks out of the first set of resource blocks comprises determining the second set of resource blocks out of the first set of resource blocks based on respective RSRP being determined to satisfy a threshold.

14. The method of claim 13,
    wherein the threshold includes a threshold value and a period of time the respective RSRP is required to exceed the threshold value.

15. The method of claim 12,
wherein the indication of the second set of resource blocks is at least one of a bitmap indicating the second set of resource blocks or an array of indices indicating the second set of resource blocks.

16. The method of claim 12,
wherein the message further includes a periodicity of the second set of resource blocks.

17. A non-transitory computer readable memory medium storing program instructions executable by processing circuitry to cause a user equipment device (UE) to:
  determine at least one reference signal received power (RSRP) for a first set of resource blocks of a plurality of resource blocks;
  determine a second set of resource blocks out of the first set of resource blocks based on the determined at least one RSRP, wherein the second set of resource blocks is a subset of the first set of resource blocks;
  transmit, to a neighboring user equipment device (UE), a message including an indication of a second set of resource blocks based on the determined at least one RSRP; and
  receive a transmission from the neighboring UE in resource blocks based on the message.

18. The non-transitory computer readable memory medium of claim 17,
wherein, to determine the second set of resource blocks out of the first set of resource blocks, the instructions are further executable by the processing circuitry to cause the UE to determine the second set of resource blocks out of the first set of resource blocks based on respective RSRP being determined to satisfy a threshold.

19. The non-transitory computer readable memory medium of claim 18,
wherein the threshold includes a threshold value and a period of time the respective RSRP is required to exceed the threshold value.

20. The non-transitory computer readable memory medium of claim 17,
wherein the indication of the second set of resource blocks is at least one of a bitmap indicating the second set of resource blocks or an array of indices indicating the second set of resource blocks; and
wherein the second set of resource blocks are at least one of semi-persistent resources or dynamic resources.

* * * * *